United States Patent
Aota et al.

(10) Patent No.: US 8,673,470 B2
(45) Date of Patent: Mar. 18, 2014

(54) SECONDARY CELL

(75) Inventors: Kinya Aota, Hitachi (JP); Toshiro Fujita, Kasumigaura (JP); Kouichi Kajiwara, Hitachinaka (JP); Masaaki Iwasa, Hitachinaka (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 487 days.

(21) Appl. No.: 13/022,038

(22) Filed: Feb. 7, 2011

(65) Prior Publication Data

US 2011/0195286 A1 Aug. 11, 2011

(30) Foreign Application Priority Data

Feb. 8, 2010 (JP) ................... 2010-025597

(51) Int. Cl.
*H01M 6/10* (2006.01)
(52) U.S. Cl.
USPC ............................................................ 429/94
(58) Field of Classification Search
USPC .................................................. 429/94, 161
See application file for complete search history.

(56) References Cited

U.S. PATENT DOCUMENTS

| 2003/0186113 | A1 | 10/2003 | Hashimoto et al. | |
|---|---|---|---|---|
| 2005/0287431 | A1* | 12/2005 | Cho | 429/161 |
| 2008/0076019 | A1* | 3/2008 | Wu | 429/161 |

FOREIGN PATENT DOCUMENTS

| JP | 2000-150306 A | 5/2000 |
|---|---|---|
| JP | 2003-297413 A | 10/2003 |
| JP | 2005-190697 A | 7/2005 |
| JP | 2005-216825 A | 8/2005 |
| JP | 3127610 U | 11/2006 |
| KR | 10-2008-0028583 | 4/2008 |

OTHER PUBLICATIONS

Machine translation of Japanese Patent Document No. JP 2000-150306 A, published on May 30, 2000.*
Korean Office Action dated Sep. 28, 2012 with English Translation (Nine (9) pages).
Japanese Office Action with English translation dated May 22, 2012 (thirteen (13) pages).

* cited by examiner

*Primary Examiner* — Carlos Barcena
*Assistant Examiner* — Lilia V Nedialkova
(74) *Attorney, Agent, or Firm* — Crowell & Moring LLP

(57) ABSTRACT

A secondary cell includes: an electrode roll in which a positive foil on which a positive-electrode material is coated and a negative foil on which a negative-electrode material is coated are winded through a separator into a flat shape around a winding core; a case in which the electrode roll is housed; a cover which seals the case; a positive terminal and a negative terminal provided on the cover; a positive electrode current collector plate that is electrically connected to the positive foil of the electrode roll and the positive terminal and held by the cover; and a negative electrode current collector plate that is electrically connected to the negative foil of the electrode roll and the negative terminal and held by the cover. The positive electrode current collector plate and the negative electrode current collector plate are each connected to the winding core.

11 Claims, 15 Drawing Sheets

SECONDARY CELL

INCORPORATION BY REFERENCE

The disclosure of the following priority application is herein incorporated by reference: Japanese Patent Application No. 2010-025597 filed Feb. 8, 2010

BACKGROUND OF THE INVENTION

1. Field of the Invention

The present invention relates to a secondary cell.

2. Description of Related Art

Recently, lithium-ion secondary cells with high energy density (Wh/kg) have been developed as a power source for hybrid vehicles, electric vehicles, and the like, and among them prismatic secondary cells with high volumetric energy density (Wh/L) are brought to the attention.

For prismatic lithium-ion secondary cells, there has been proposed a method in which a flat-shaped electrode roll is prepared by winding a positive electrode sheet where a positive electrode is coated on a positive foil, a negative electrode sheet where a negative electrode is coated on a negative foil, and an insulating separator, and an uncoated positive foil and an uncoated negative foil are exposed at the axial ends of the electrode roll so as to connect each of the exposed portions with a current collector plate.

Japanese Laid Open Patent Publication No. 2005-216825 discloses a structure in which a U-shaped current collector plate is inserted inside the winding of a winded body and the exposed portion is divided into two so as to connect each of them with a current collector plate. This allows the exposed portion to be reduced in width, which is advantageous in reducing a cell in size.

SUMMARY OF THE INVENTION

However, although an in-vehicle secondary cell requires not only downsizing but also strength against loads such as vehicle vibrations and shocks, the positive foil for an electrode roll is an aluminium foil of approximately 10 to 30 μm in thickness and the negative foil is a copper foil of approximately 10 to 30 μm in thickness, which are low in strength in themselves. Contrary to those strengths, an electrode roll is large in weight, and therefore an inertia force occurs in the electrode roll according to the load in the structure in which exposed portions (connection sections) of the positive and negative foils are connected to positive and negative electrode current collector plates. As a result, a secondary cell requires configurations that can endure such load, which constitutes a barrier to reduction in size and weight.

A secondary cell according to a first aspect of the present invention, comprises: an electrode roll in which a positive foil on which a positive-electrode material is coated and a negative foil on which a negative-electrode material is coated are winded through a separator into a flat shape around a winding core; a case in which the electrode roll is housed; a cover which seals the case; a positive terminal and a negative terminal provided on the cover; a positive electrode current collector plate that is electrically connected to the positive foil of the electrode roll and the positive terminal and held by the cover; and a negative electrode current collector plate that is electrically connected to the negative foil of the electrode roll and the negative terminal and held by the cover, wherein: the positive electrode current collector plate and the negative electrode current collector plate are each connected to the winding core.

According to a second aspect of the present invention, in the secondary cell according to the first aspect, it is preferable that the winding core includes projections that project from both end faces of the winding core in a winding axis direction of the electrode roll, and one of the projections is engaged with the positive electrode current collector plate and another of the projections is engaged with the negative electrode current collector plate so as to fix the projections and each of the positive and negative electrode current collector plates.

According to a third aspect of the present invention, the secondary cell according to the first aspect may further comprise: a positive electrode supporting body that fits on an inner peripheral side of the electrode roll at a positive electrode-side end in a winding axis direction of the electrode roll and is connected with the winding core; and a negative electrode supporting body that fits on an inner peripheral side of the electrode roll at a negative electrode-side end in the winding axis direction of the electrode roll and is connected with the winding core, wherein the winding core includes a plurality of projections that project from both end faces of the winding core in the winding axis direction of the electrode roll, first projections that are adjacent to the cover among the plurality of projections are engaged with the positive and negative electrode current collector plates, and the positive and negative electrode supporting bodies are connected to a plurality of second projections, other than the first projections among the plurality of projections.

According to a fourth aspect of the present invention, in the secondary cell according to the third aspect, the plurality of second projections to which the positive electrode supporting body and the negative electrode supporting body are connected may be arranged on each end face of the winding core at positions separated from each other on a cover side and a case bottom side across a winding axis.

According to a fifth aspect of the present invention, in the secondary cell according to the third aspect, the first projections may be arranged between the second projections and the positive and negative terminals.

A secondary cell according to a sixth aspect of the present invention comprises: an electrode roll in which a positive foil on which a positive-electrode material is coated and a negative foil on which a negative-electrode material is coated are winded through a separator into a flat shape around a winding core; a case in which the electrode roll is housed; a cover which seals the case; a positive terminal and a negative terminal provided on the cover; a positive electrode current collector plate that is electrically connected to the positive foil of the electrode roll and the positive terminal and held by the cover; a negative electrode current collector plate that is electrically connected to the negative foil of the electrode roll and the negative terminal and held by the cover; a positive electrode supporting body that fits on an inner peripheral side of the electrode roll at a positive electrode-side end in a winding axis direction of the electrode roll and is connected with the winding core; and a negative electrode supporting body that fits on an inner peripheral side of the electrode roll at a negative electrode-side end in the winding axis direction of the electrode roll and is connected with the winding core, wherein: the winding core includes a plurality of projections that project from both end faces of the winding core in the winding axis direction of the electrode roll, and the positive and negative electrode supporting bodies are connected to the projections.

According to a seventh aspect of the present invention, in the secondary cell according to the sixth aspect, the plurality of projections to which the positive electrode supporting body and the negative electrode supporting body are connected may be arranged on each end face of the winding core at positions separated from each other on a cover side and a case bottom side across a winding axis.

According to a eighth aspect of the present invention, in the secondary cell according to the firs aspect, it is preferable that the positive electrode current collector plate and the negative electrode current collector plate each include a pair of connecting pieces, with each connecting pieces contacting deformed portions formed on both sides of the electrode roll, which are flat outer surfaces of the electrode roll; and the pair of positive electrode connecting pieces and the pair of negative electrode connecting pieces are welded to the positive foil and the negative foil, respectively, of the deformed portions.

According to a ninth aspect of the present invention, in the secondary cell according to the first aspect, it is preferable that the positive electrode current collector plate and the negative electrode current collector plate each include one connecting piece that contacts a deformed portion formed on one of both sides of the electrode roll, which are flat outer surfaces of the electrode roll; and the positive electrode connecting piece and the negative electrode connecting piece are welded to one side of the positive foil and the negative foil, respectively, of the deformed portion.

According to a tenth aspect of the present invention, in the secondary cell according to the first aspect, it is preferable that the positive electrode current collector plate and the negative electrode current collector plate each include a pair of connecting pieces which are deformable towards and away from both sides of the electrode roll, which are flat outer surfaces of the electrode roll, the pair of connecting pieces of the positive electrode current collector plate are connected to the positive foil, and the pair of connecting pieces of the negative electrode current collector plate are connected to the negative foil.

According to a eleventh aspect of the present invention, in the secondary cell according to the first aspect, it is preferable that the positive electrode current collector plate and the negative electrode current collector plate each include one connecting piece which is deformable towards and away from one of both sides of the electrode roll, which are flat outer surfaces of the electrode roll, the positive electrode current collector plate is connected to the positive foil through the connecting piece and the negative electrode current collector plate is connected to the negative foil through the connecting piece.

According to a twelfth aspect of the present invention, in the secondary cell according to the first aspect, it is preferable that a deformed portion formed on the electrode roll is sandwiched and welded between a pair of connection portions of the positive electrode supporting body and a pair of connecting pieces of the positive electrode current collector plate, and a deformed portion formed on the electrode roll is sandwiched and welded between a pair of connection portions of the negative electrode supporting body and a pair of connecting pieces of the negative electrode current collector plate.

DESCRIPTION OF PREFERRED EMBODIMENTS

Embodiments in which the secondary cell according to the present invention is applied to a prismatic lithium-ion secondary cell will now be explained with reference to the drawings.

First Embodiment

Structure of Secondary Cell

Figure 1:
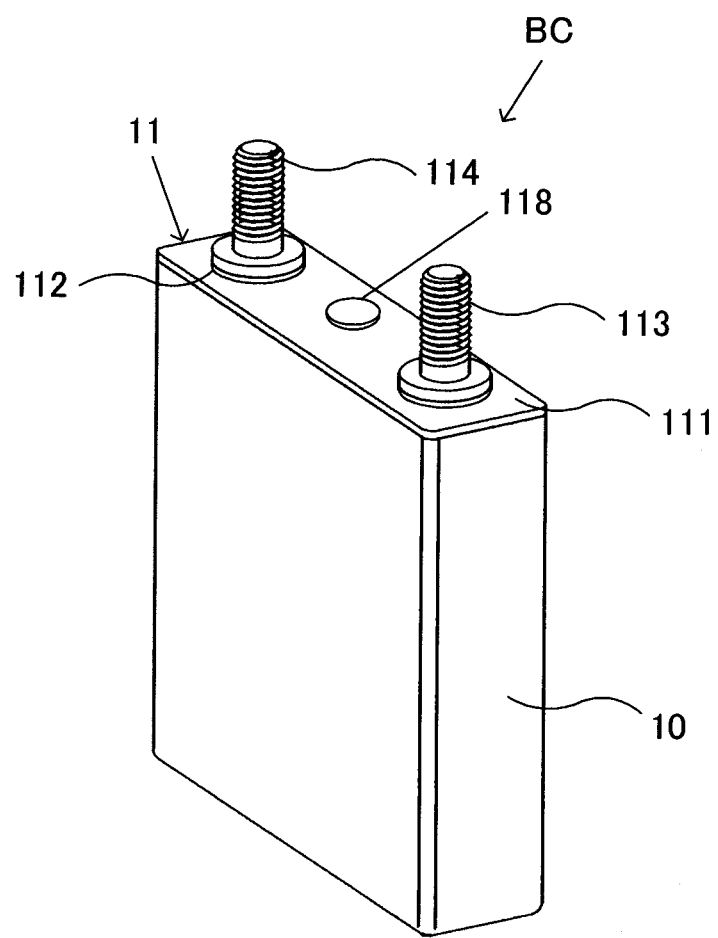
FIG. 1 is a perspective view showing a secondary cell of the first embodiment of the present invention.
Figure 2:
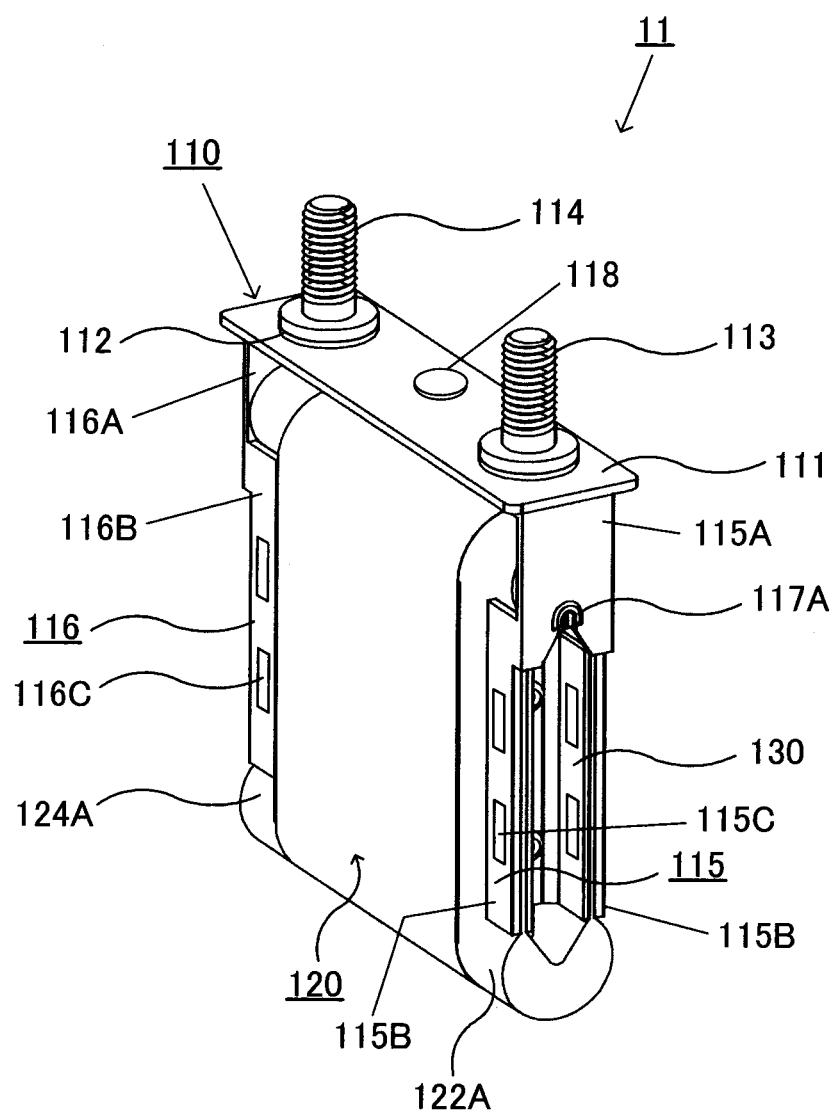
FIG. 2 is a perspective view showing an assembly of discharge and charge elements according to the first embodiment.

As shown in FIG. 1, a lithium-ion secondary cell BC includes a case 10 having an opening at one end and an assembly of discharge and charge elements 11, which is shown in FIG. 2, that is housed in the case 10.

Assembly of Discharge and Charge Element

Figure 3:
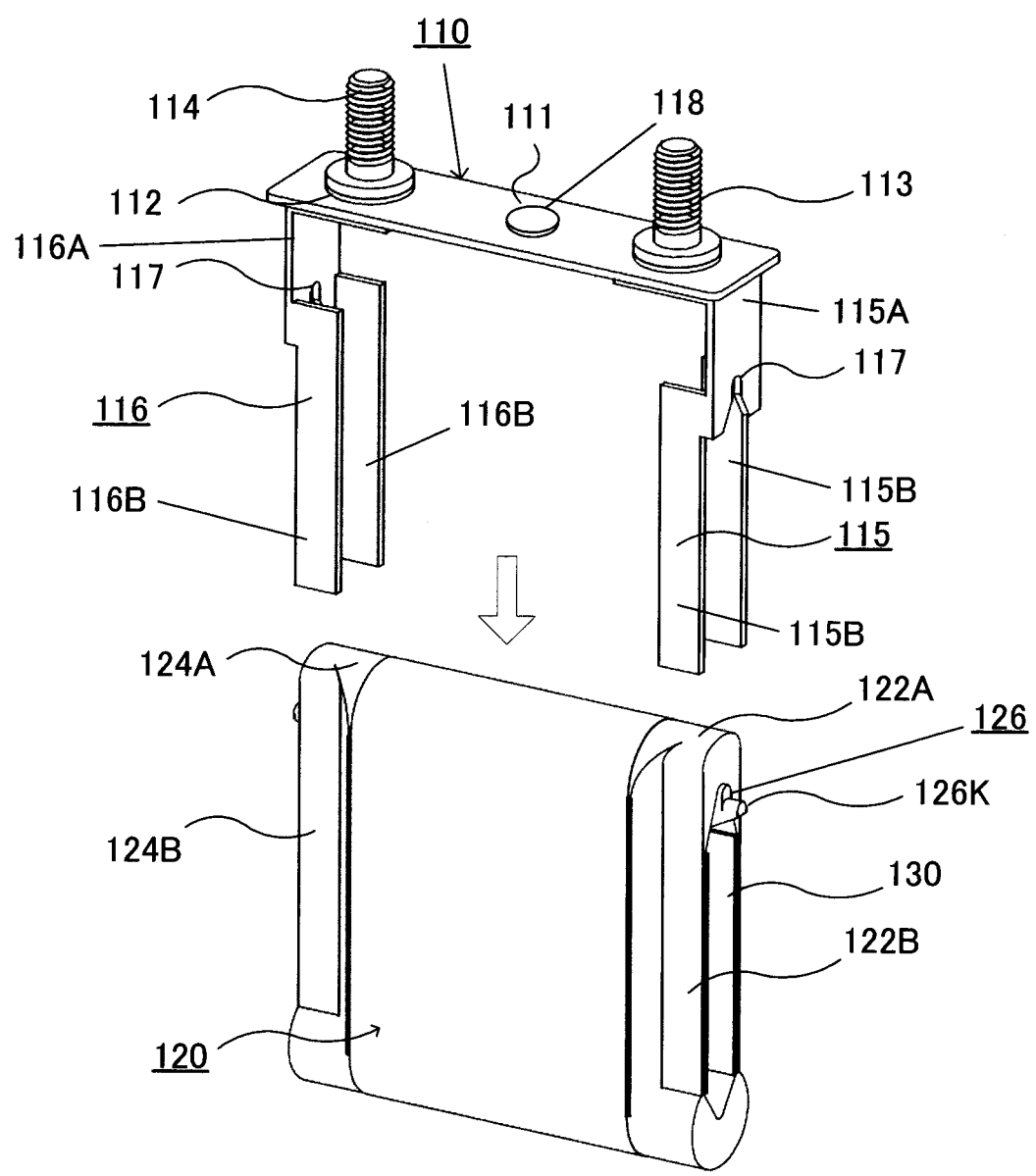
FIG. 3 is a perspective view showing a state in which a top cover assembly of the first embodiment is being connected to an electrode roll.
Figure 4:
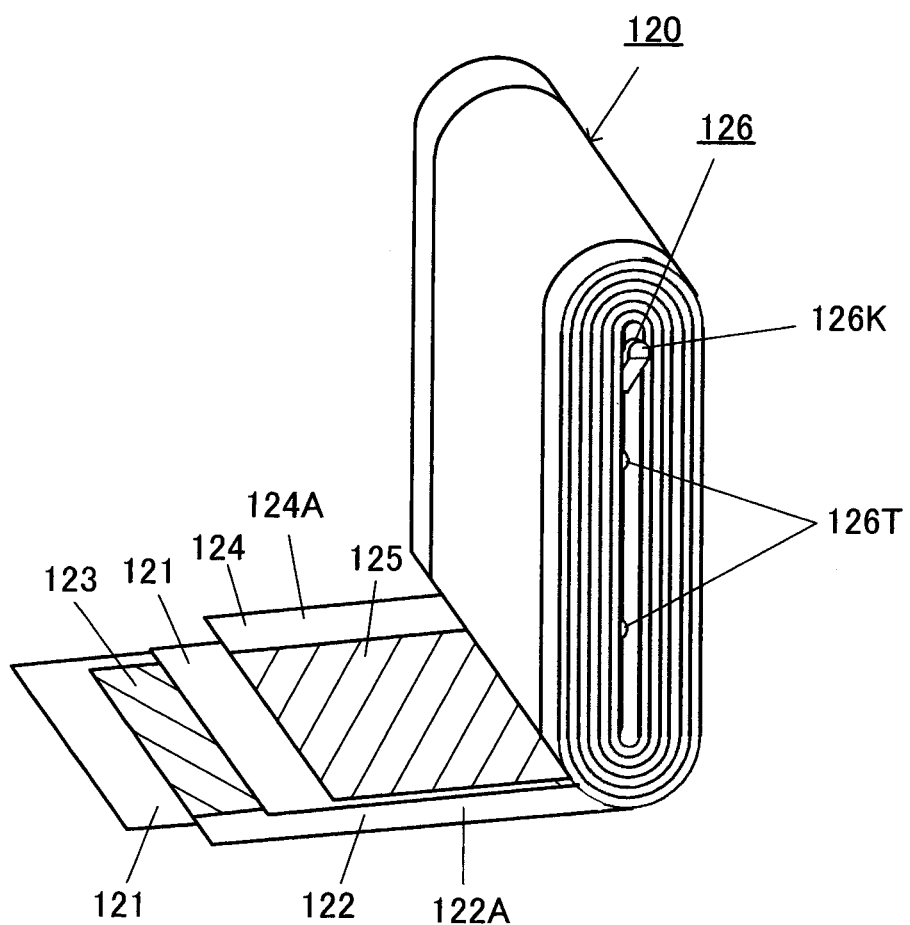
FIG. 4 is an exploded perspective view showing an electrode roll of the first embodiment.

As shown in FIG. 2, the assembly of discharge and charge elements 11 includes a top cover assembly 110 as shown in FIG. 3 and an electrode winding assembly 120 as shown in FIG. 4.

Top Cover Assembly

As shown in FIG. 3, the top cover assembly 110 includes a cover 111 that covers the opening of the case 10, positive and negative terminals 113 and 114 protruding from the cover 111 through an insulating sealing member 112, and positive and negative current collector plates 115 and 116 connected to the positive and negative terminals 113 and 114 respectively. The positive and negative terminals 113 and 114 are electrically insulated from the cover 111 through the insulating sealing member 112.

The positive electrode current collector plate 115 includes a base 115A that extends in the secondary cell bottom direction along the positive electrode-side end in the winding axis direction of the electrode winding assembly 120, and a pair of positive electrode connecting pieces 115B that are bifurcated from the both sides of the bottom end of the base 115A, bent at a right angle in the direction along the both sides of the flat outer peripheral surface of the electrode winding assembly 120, and extend in the case bottom direction.

Similarly, the negative electrode current collector plate 116 includes a base 116A that extends in the secondary cell bottom direction along the negative electrode-side end in the winding axis direction of the electrode winding assembly 120, and a pair of negative electrode connecting pieces 116B that are bifurcated from the both sides of the bottom end of the base 116A, bent at a right angle in the direction along the both sides of the flat outer peripheral surface of the electrode winding assembly 120, and extend in the case bottom direction.

As described later, the pair of positive electrode connecting pieces 115B are attached so as to insert and sandwich a positive electrode deformed portion 122B of the electrode winding assembly 120 and the pair of negative electrode connecting pieces 116B are attached so as to insert and sandwich a negative electrode deformed portion 124B of the electrode winding assembly 120.

Electrode Winding Assembly

Figure 5:
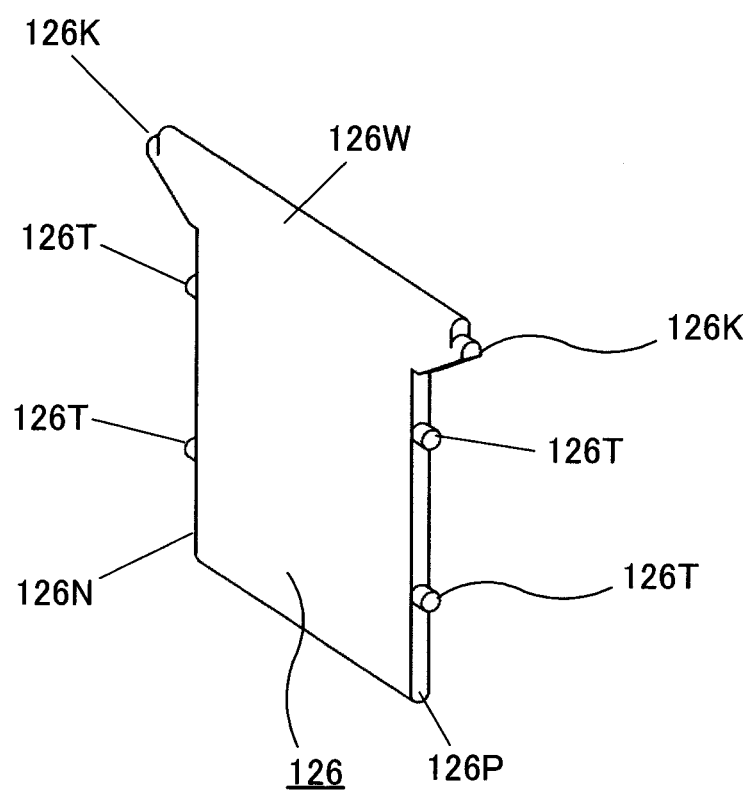
FIG. 5 is a perspective view showing a center core of the first embodiment.

As shown in FIG. 4, the electrode winding assembly 120 is constituted with a positive foil 122 and a negative foil 124, sandwiching a separator 121 therebetween, winded in a flat shape around a center core 126, shown in FIG. 5. The positive foil 122 is aluminum of 30 μm in thickness and the negative foil 124 is copper of 15 μm in thickness. In addition, the separator 121 is of porous polyethylene resin.

A positive-electrode material 123 containing a positive-electrode active material, such as a lithium metal oxide, is coated on both sides of the positive foil 122 so as to function as a positive electrode, and a negative-electrode material 125 containing a negative-electrode active material, such as graphite carbon, is coated on both sides of the negative foil 124 so as to function as a negative electrode. On one end of the electrode winding assembly 120, a positive electrode connection portion 122A is provided on which no positive-electrode material 123 is coated and the positive foil 122 is exposed. On the other end of the electrode winding assembly, which is a negative electrode-side, a negative electrode connection portion 124A is provided on which no negative-electrode material 125 is coated and the negative foil 124 is exposed. The positive and negative foils 122 and 124 are, as described later, connected to the positive and negative current collector plates 115 and 116 through the positive and negative electrode connection portions 122A and 124A, respectively.

Winding Core

The winding core 126 will now be explained with reference to FIG. 5. The winding core 126, made of polypropylene resin, is a plate-like member of 2 mm in thickness, which is slightly narrower than the winding width of the electrode winding assembly 120. The winding core 126 is provided, at its end on the cover 111 side, with a wide portion 126W, which is slightly narrower than the width of the long side of the cover 111. Two current collector plate fixing projections 126T project at intervals from a positive electrode-side end face 126P and a negative electrode-side end face 126N, respectively, in the winding axis direction of the winding core 126. As described later in detail with reference to FIG. 6 and FIG. 7, positive and negative electrode supporting bodies 130 and 140 are fixed to the current collector plate fixing projections 126T.

A current collector plate fixing projection 126K projects on each end face of the positive and negative electrode-sides of the wide portion 126W. As described later, the winding core 126 is fixed by engaging the current collector plate fixing projections 126K with current collector plate connection portions 117 of the positive and negative electrode current collector plates 115 and 116. As a result of this fixing, the electrode winding assembly 120 is held by the cover 111 through the positive and negative electrode current collector plates 115 and 116.

Figure 6:
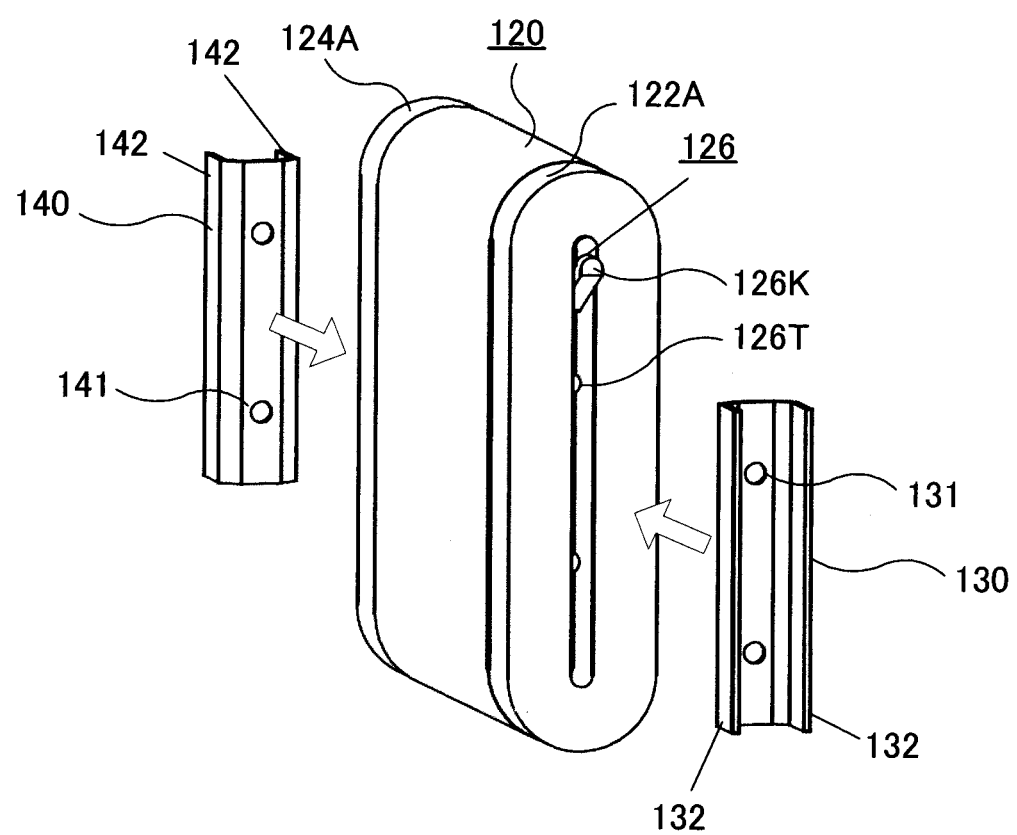
FIG. 6 is a perspective view showing a state in which a supporting plate is being mounted to the electrode roll of the first embodiment.

As shown in FIG. 6, the positive electrode supporting body 130 is attached to the positive electrode-side end face in the winding axis direction of the electrode winding assembly 120, and the negative electrode supporting body 140 is attached to the negative electrode-side end face. The positive and negative electrode supporting bodies 130 and 140 are each a channel plate with a U-shaped cross section, at whose channel bottom two fixing holes 131 and 141, respectively, are drilled corresponding to the current collector plate fixing projections 126T. Each leg of the U-shaped positive electrode supporting body 130 constitutes a positive electrode connection portion 132 to be connected to the positive electrode connection portion 122A, and, similarly, each leg of the U-shaped negative electrode supporting body 140 constitutes a negative electrode connection portion 142 to be connected to the negative electrode connection portion 124A.

The positive electrode supporting body 130 is fixed to the winding core 126 of the electrode winding assembly 120 and, at an ultrasonic welding zone 115C (refer to FIG. 2), ultrasonic welded to the positive electrode connecting pieces 115B of the positive electrode current collector plate 115. The negative electrode supporting body 140 is fixed to the winding core 126 of the electrode winding assembly 120 and, at an ultrasonic welding zone 116C (refer to FIG. 2), ultrasonic welded to the negative electrode connecting pieces 116B of the negative electrode current collector plate 116.

The positive electrode current collector plate 115 is connected to the positive electrode connection portion 122A of the electrode winding assembly 120 at the ultrasonic welding zone 115C, and the negative electrode current collector plate 116 is connected to the negative electrode connection portion 124A of the electrode winding assembly 120 at the ultrasonic welding zone 116C.

Figure 7:
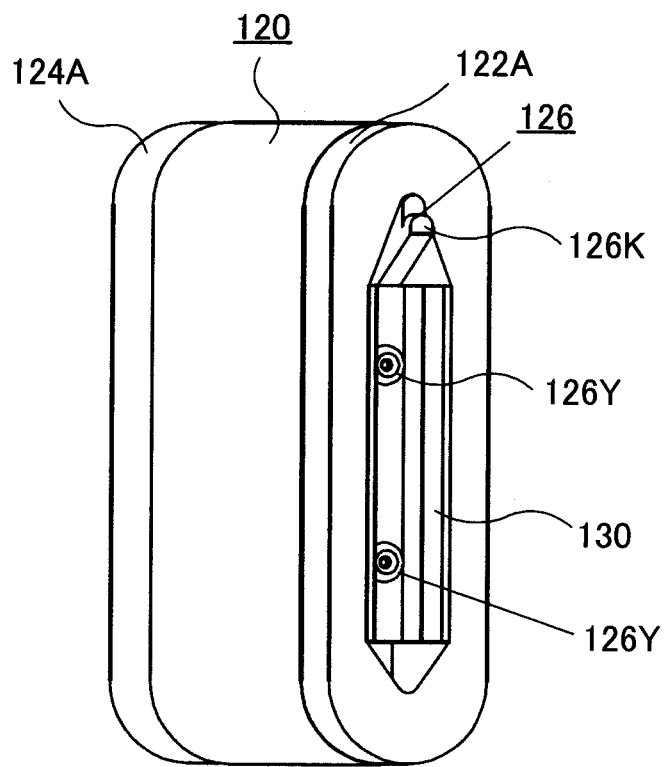
FIG. 7 is a perspective view showing a state in which the electrode roll and the supporting plate in FIG. 6 are fixed.

The positive and negative electrode supporting bodies 130 and 140 are connected with the winding core 126 at the end faces in the winding axis direction of the electrode winding assembly 120. In other words, the positive and negative electrode supporting bodies 130 and 140 are each connected with the winding core 126 in a state in which the protruded back side of the channel bottom is inserted into the winding center of the electrode winding assembly 120. As a result, the positive and negative electrode supporting bodies 130 and 140 fit in the end face side of the electrode winding assembly 120 and their outer peripheries are held by the electrode winding assembly 120. As shown in FIG. 7, the electrode winding assembly 120 is thus prepared, in which the positive and negative electrode supporting bodies 130 and 140 are connected to the winding core 126.

In the electrode winding assembly 120 shown in FIG. 7, the positive and negative electrode supporting bodies 130 and 140 are fixed through weld zones 126Y of each of the two current collector plate fixing projections 126T of the winding core 126. The two current collector plate fixing projections 126T are separated from each other on the cover side and the cell bottom side across the winding axis center. This prevents the electrode winding assembly 120 from rotating around the winding axis with respect to the positive and negative electrode supporting bodies 130 and 140.

Assembly of Secondary Cell

As shown in FIG. 3, the assembly of discharge and charge elements 11 is made by integrating the top cover assembly 110 and the electrode winding assembly 120, and such assembly of discharge and charge elements 11 is inserted into the case 10. The cover 111 is laser welded to the case 10 so as to seal the case 10. The cover 111 is provided with an electrolyte filling inlet, so that, after welding the cover 111 to the case 10, electrolyte (not shown in the figures) is inlet to the case 10 through the electrolyte filling inlet. After the electrolyte is inlet, an electrolyte filling plug 118 is laser welded to the electrolyte filling inlet and sealed. A gasket 112 constituted with insulating resin is attached to the positive and negative terminals 113 and 114 so as to be electrically insulated from the cover 111, and also to provide water seal between the positive and negative terminals 113 and 114 and the cover 111.

Assembly of Group of Discharge and Charge Element

The assembly procedure of the assembly of discharge and charge element 11 will be explained.

At first, the electrode winding assembly 120 shown in FIG. 4 is prepared. In other words, the positive foil 122 and the negative foil 124 are winded through the separator 121 on the winding core 126. Next, as shown in FIG. 6, the current collector plate fixing projections 126T of the winding core 126 are inserted into the fixing holes 131 and 141 of the supporting bodies 130 and 140, and the positive and negative electrode supporting bodies 130 and 140 are engaged with the winding core 126. Then, the four current collector plate fixing projections 126T are deformed by heat welding, so that the positive and negative electrode supporting bodies 130 and 140 are fixed to the winding core 126. Such state is shown in FIG. 7. A reference numeral 126Y of FIG. 7 denotes a heat weld zone.

As shown in FIG. 3, the positive and negative electrode current collector plates 115 and 116, which are mounted to the cover 111, are fed towards the electrode winding assembly 120 as indicated by the arrow in the figure so that the pair of positive electrode connecting pieces 115B sandwich the positive electrode supporting body 130 mounted to the electrode winding assembly 120 and at the same time the negative electrode connecting pieces 116B sandwich the negative electrode supporting body 140 mounted to the electrode winding assembly 120.

The positive and negative foil deformed portions 122B and 124B are formed by crushing the layered positive and negative foils 122 and 124 at the positive and negative electrode connection portions 122A and 124A. The positive and negative foil deformed portions 122B and 124B are formed before insertion so as to facilitate the electrode winding assembly 120 to be inserted between the two positive and negative electrode current collector plates 115 and 116.

The top cover assembly 110 is slid onto the electrode winding assembly 120 until the current collector plate fixing projections 126K provided on the winding core 126 are engaged with the current collector plate connection portions 117 provided on the positive electrode current collector plate base 115A and the negative electrode current collector plate base 116A.

The connecting pieces 115B and 116B of the positive and negative electrode current collector plates 115 and 116 are connected to the positive and negative foil deformed portions 122B and 124B, which are formed on both sides of the flat outer peripheral surface of the electrode winding assembly 120, and thus the positive and negative electrode current collector plates 115 and 116 are mounted onto the electrode winding assembly 120 with ease compared to a case in which the current collector plates are connected on the inner peripheral side of the electrode roll.

Figure 8:
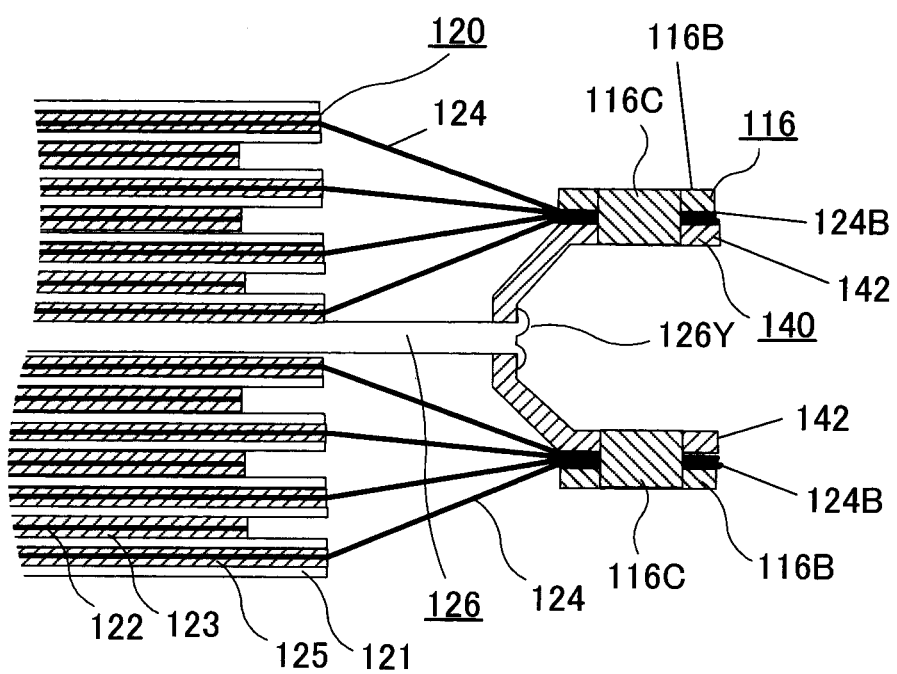
FIG. 8 is a sectional view showing a state in which a negative foil and a current collector plate of the first embodiment are connected.

As shown in FIG. 8, the negative electrode supporting body 140 is arranged so that each of the negative electrode connection portions 142 of the negative electrode supporting body 140 and each of the negative electrode connecting pieces 116B of the negative electrode current collector plate 116 sandwich the negative foil deformed portion 124B. At the position of the ultrasonic welding zones 116C, each negative electrode connecting piece 116B, the negative foil deformed portion 124B, and each negative electrode connection portion 142 are welded.

While not shown in the figures, similarly, the positive electrode supporting body 130 is arranged so that each of the positive electrode connection portions 132 of the positive electrode supporting body 130 and each of the positive electrode connecting pieces 115B of the positive electrode current collector plate 115 sandwich the positive foil deformed portion 122B. At the position of the ultrasonic welding zones 115C, each positive electrode connecting piece 115B, the positive foil deformed portion 122B, and each positive electrode connection portion 132 are welded.

As a result, the positive electrode connection portion 122A of the positive foil 122, which is exposed on both sides of the flat electrode winding assembly 120, is integrally connected with the positive electrode supporting body 130 and the connecting pieces 115B of the positive electrode current collector plate 115, and the negative electrode connection portion 124A of the negative foil 124, which is exposed on both sides of the flat electrode winding assembly 120, is integrally connected with the negative electrode supporting body 140 and the connecting pieces 116B of the negative electrode current collector plate 116.

Since the ultrasonic welding zones 115C and 116C are disposed symmetrically at positions opposite to each other across the positive and negative electrode connection portions 132 and 142 of the positive and negative electrode supporting bodies 130 and 140, and at the positions symmetric with respect to the winding axis, i.e., those separated from each other on the cover side and the cell bottom side across the center of the winding axis, high strength can be assured against vibrations centered around the bases 115A and 116A of the positive and negative electrode current collector plates 115 and 116.

It is to be noted that in case of adopting the structure in which a means for fixing the positive and negative electrode current collector plates to the winding core is not provided, load may be applied to connection portions of positive and negative foils.

The positive electrode supporting body 130 is aluminium of 0.3 mm in thickness, and the positive electrode current collector plate 115 is aluminium of 0.6 mm in thickness. In addition, the positive foil 122 is an aluminium foil of 20 μm in thickness, 30 of which are layered in the electrode winding assembly 120. For ultrasonic welding, the positive electrode supporting body 130, the connecting piece 115B of the positive electrode current collector plate 115, and the positive foil 122 are sandwiched by a vibration element and a stator for ultrasonic welding, and the four locations are welded as shown in FIG. 2 in conditions of 0.5 seconds in welding time, 25 μm in amplitude, and 2.7 kN in pressure force.

The negative electrode supporting body 140 is a copper plate of 0.3 mm in thickness, and the negative electrode current collector plate 116 is a copper plate of 0.5 mm in thickness. In addition, the negative foil 124 is a copper foil of 15 μm in thickness, 30 of which are layered in the electrode winding assembly 120. On the negative electrode side, similarly, four locations are ultrasonic welded in conditions of 0.4 seconds in welding time, 25 μm in amplitude, and 3.8 kN in pressure force.

In addition, as shown in FIG. 2, a current collector plate resin weld zone 117A is formed by heated and pressed through heat weld in a state in which the current collector plate fixing projections 126K are inserted into the current collector plate connection portions 117. As a result, the positive and negative electrode current collector plates 115 and 116 are connected directly to the winding core 126 through the bases 115A and 116A.

It is to be noted that the positive and negative electrode current collector plates 115 and 116 are current paths through which electric power stored at the electrode winding assembly 120 is collected and derived, and also is drawn to the electrode winding assembly 120.

The following operations and advantageous effects can be achieved according to the secondary cell according to the first embodiment explained above.

(1) Since the positive and negative electrode current collector plates 115 and 116 are connected to the winding core 126, the electrode roll 120 is fixed to the cover 111, thereby preventing reduction in endurance due to vibrations of the electrode roll 120.

(2) The positive and negative electrode supporting bodies 130 and 140 are arranged on the inner peripheral surface side of the both ends in the winding axis direction of the electrode roll 120 and connected to the winding core 126, and in addition, the supporting bodies 130 and 140, the current collector plate connecting pieces 115B and 116B, and the positive and negative foils 122 and 124 are welded together. As a result, the electrode roll 120 is securely connected to the current collector plates 115 and 116.

(3) Since the current collector plate connecting pieces 115B and 116B lie between the ultrasonic welding zones 115C and 116C and the positive and negative terminals 113 and 114, and the electrode winding assembly 120 is integrated with the positive and negative electrode current collector plates 115 and 116 and the positive and negative electrode supporting bodies 130 and 140, inertia force of the electrode winding assembly 120 acts integrally on the current collector plate connecting plates 115 and 116 and do not act on the positive and negative foils 122 and 124. As a result, the electrode winding assembly 120 can be protected.

(4) By bifurcating the positive and negative electrode current collector plates 115 and 116 into the positive electrode connecting pieces 115B and the negative electrode connecting pieces 116B, respectively, connection resistance between the positive and negative electrode current collector plates 115 and 116 and the positive and negative electrodes 123 and 125 can be reduced without increasing the widths of the connecting pieces 115B and 116B.

Second Embodiment

The second embodiment of the secondary cell according to the present invention will now be explained with reference to FIG. 9 to FIG. 11.

It is to be noted that parts in the figures that are identical or corresponding to those in the first embodiment are designated by the same reference numerals, and their description will be curtailed.

Figure 9:
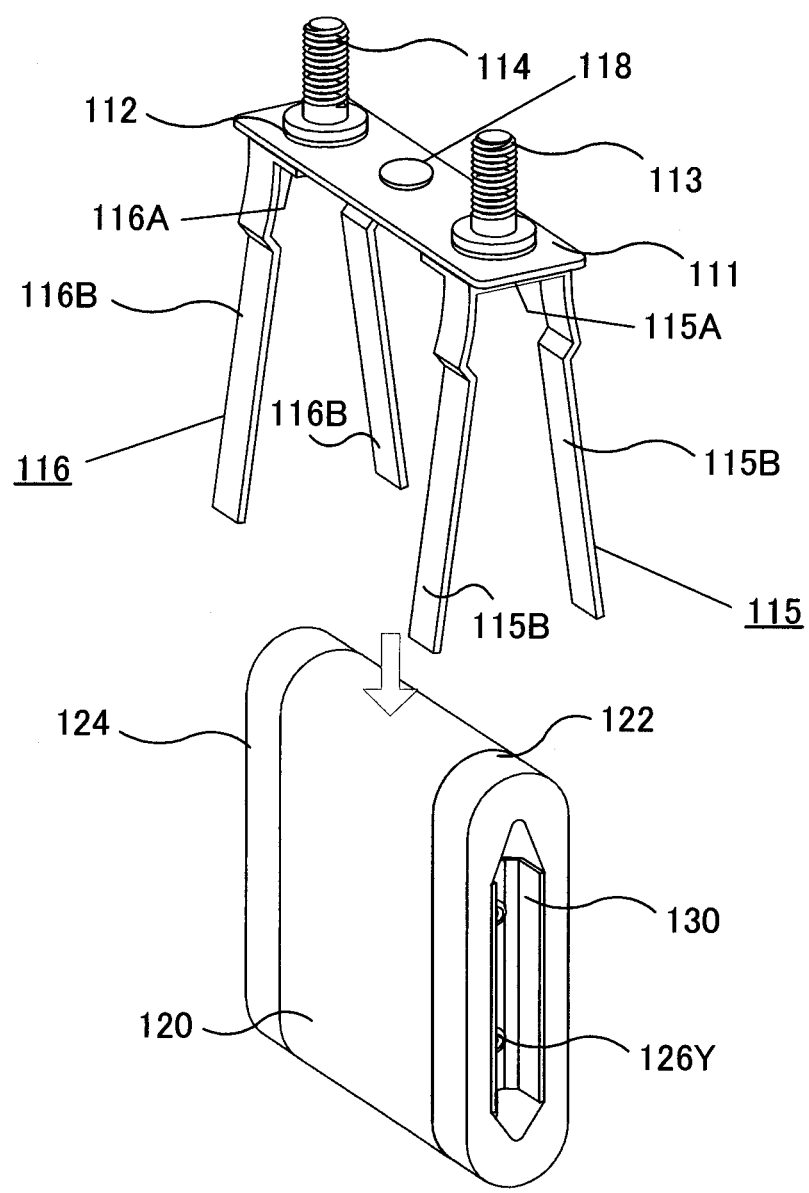
FIG. 9 is a perspective view showing a state in which an electrode roll is being inserted into current collector plates in the second embodiment of the secondary cell according to the present invention.
Figure 10:
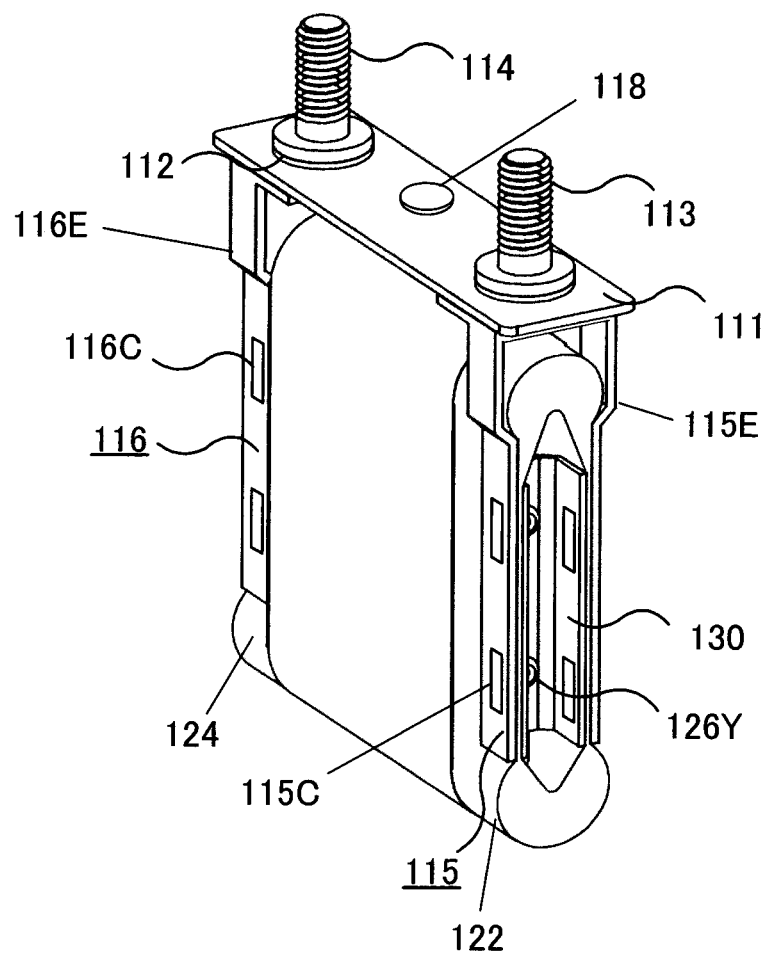
FIG. 10 is a perspective view showing an assembly of discharge and charge elements of the second embodiment of the present invention.

As shown in FIG. 9 and FIG. 10, the positive and negative electrode current collector plates 115 and 116 according to the second embodiment include bases 115A and 116A contacting the bottom face of the cover 111 and positive electrode connecting pieces 115B and negative electrode connecting pieces 116B extending in a flared and bifurcated manner from the bases 115A and 116A towards the cell bottom. Bend portions 115E and 116E are formed at the upper portions of the connecting pieces 115B and 116B.

Figure 11:
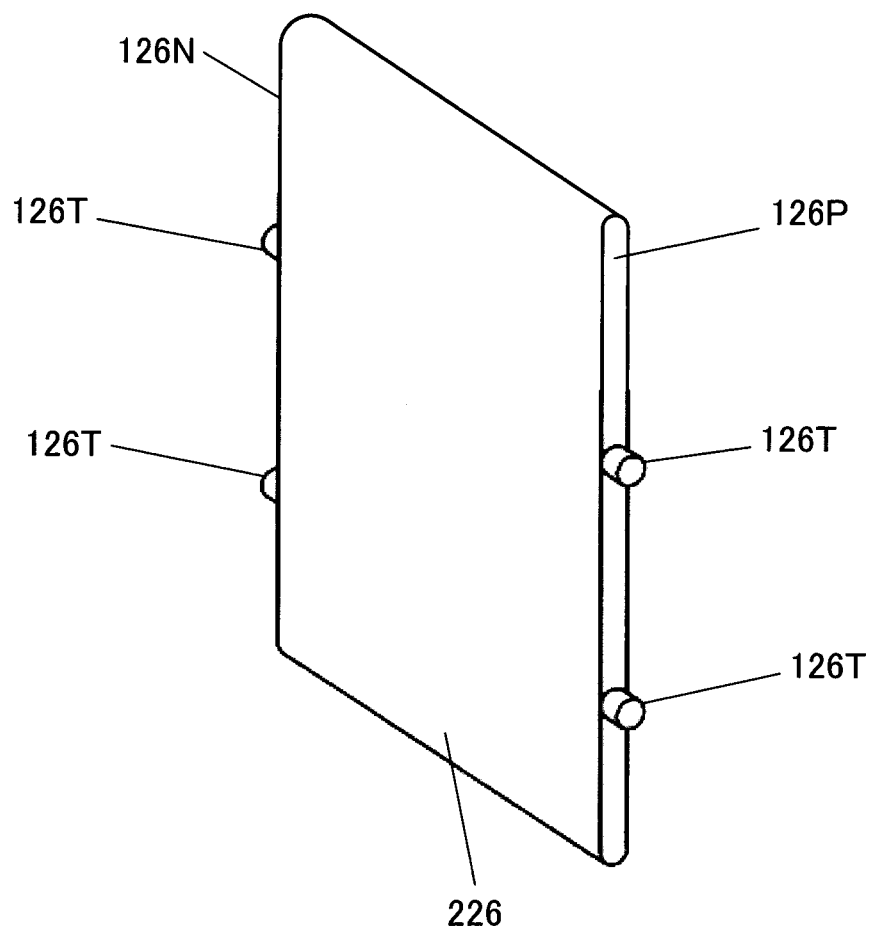
FIG. 11 is a perspective view showing a center core of the second embodiment.

In addition, as shown in FIG. 11, a winding core 226 has the structure equivalent to that shown in FIG. 2 without the wide portion 126W and the current collector plate fixing projections 126K. In other words, the winding core 226 is rectangular.

The electrode winding assembly 120 is inserted between the flared positive and negative electrode connecting pieces 115B and 116B, the pair of positive electrode connecting pieces 115B sandwich the part of the positive foil 122, which is exposed on the both sides of the flat outer periphery of the electrode roll 120, and the pair of negative electrode connecting pieces 116B sandwich the part of the negative foil 124, which is exposed on the both sides of the flat outer periphery of the electrode roll 120. In this case, since the bend portions 115E and 116E have been provided, a space for housing a wind end of the electrode winding assembly 120, which is made to be a sector with a larger radius can be assured at the top end of the positive and negative electrode connecting pieces 115B and 116B.

Similarly to the first embodiment, the positive electrode connecting pieces 115B and the positive electrode connection portions 132 of the positive electrode supporting body 130 are welded together at the welding zone 115C, and the negative electrode connecting pieces 116B and the negative electrode connection portions 142 of the negative electrode supporting body 140 are welded together at the welding zone 116C.

The following operations and advantageous effects can be achieved according to the secondary cell according to the second embodiment.

(1) The positive electrode connecting pieces 115B and the negative electrode connecting pieces 116B can be arbitrarily deformed towards and away from the both sides of the flat outer periphery of the electrode winding assembly 120. This allows the interval between the positive electrode connecting pieces 115B and the interval between the negative electrode connecting pieces 116B to be arbitrarily adjusted. The positive electrode connecting pieces 115B and the negative electrode connecting pieces 116B each can be widened when inserting the electrode winding assembly 120 between the positive electrode connecting pieces 115B and between the negative electrode connecting pieces 116B, thereby making assembling easy.

(2) The positive and negative electrode connecting pieces 115B and 116B, which are to open and close, allow assembly workability to be improved, and in addition, the work to form in advance the positive foil deformed portion 122B and the negative foil deformed portion 124B to be curtailed. In other words, the pair of positive electrode connecting pieces 115B compress the exposed part of the positive foil 122 on the outer peripheral surface of the electrode roll 120, and the pair of negative electrode connecting pieces 116B compress the exposed part of the negative foil 124 on the outer peripheral surface of the electrode roll 120 so that the both ends of the electrode winding assembly 120 each can be deformed.

(3) Although the positive and negative electrode current collector plates 115 and 116 and the winding core 226 are not directly connected, since the positive electrode connection portion 122A of the electrode winding assembly 120 is sandwiched and welded between each of the connection portions 132 (refer to FIG. 6) of the positive electrode supporting body 130 fixed to the winding core 226 and each of the positive electrode connecting pieces 115B, and the negative electrode connection portion 124A of the electrode winding assembly 120 is sandwiched and welded between each of the connection portions 142 (refer to FIG. 6) of the negative electrode supporting body 140 fixed to the winding core 226 and each of the positive electrode connecting piece 116B, sufficient vibration resistance and shock resistance can be assured.

It is to be noted that although in the secondary cell of the second embodiment, the positive and negative electrode current collector plates 115 and 116 are configured to be able to open and close, current collector plates which do not open and close may as well be adopted.

Third Embodiment

The third embodiment of the secondary cell according to the present invention will be explained with reference to FIG. 12.

It is to be noted that parts in the figures that are identical or corresponding to those in the second embodiment are designated by the same reference numerals, and their description will be curtailed. However, explanations on the winding core 126 will be made with reference to that of the first embodiment shown in FIG. 5.

Figure 12:
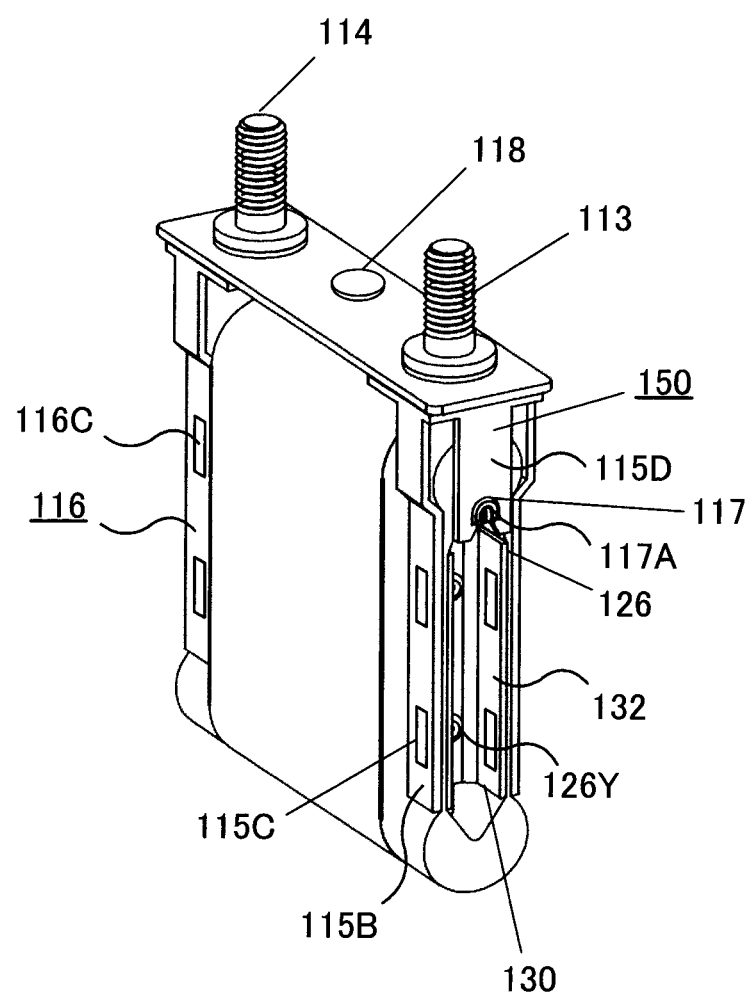
FIG. 12 is a perspective view showing an assembly of discharge and charge elements in the third embodiment of the secondary cell according to the present invention.

As shown in FIG. 12, the third embodiment is configured such that a positive electrode fixing portion 115D and a negative electrode fixing portion (not figured) for connection with the winding core 126 of the first embodiment are added to the positive and negative electrode current collector plates 115 and 116 of the second embodiment, respectively. The positive electrode fixing portion 115D extends towards the secondary cell bottom along the positive electrode-side end face in the winding axis direction of the electrode winding assembly 120, and the current collector plate connection portion 117 is provided at the end in the case bottom direction of the positive electrode fixing portion 115D. Similarly, although not figured, the current collector plate connection portion 117 is provided at the end in the case bottom direction of the negative electrode fixing portion. The current collector plate fixing projections 126K (refer to FIG. 5) are inserted into the current collector plate connection portions 117, so that the current collector plate resin weld zones 117A are formed. As a result, the positive and negative electrode current collector plates 115 and 116 are directly connected to the winding core 126.

According to the secondary cell of the third embodiment, advantageous effects of increase in vibration resistance and shock resistance can be achieved in addition to the advantageous effects by the second embodiment.

Fourth Embodiment

The fourth embodiment of the secondary cell according to the present invention will be explained with reference to FIG. 13.

It is to be noted that parts in the figures that are identical or corresponding to those in the second embodiment are designated by the same reference numerals, and their description will be curtailed.

Figure 13:
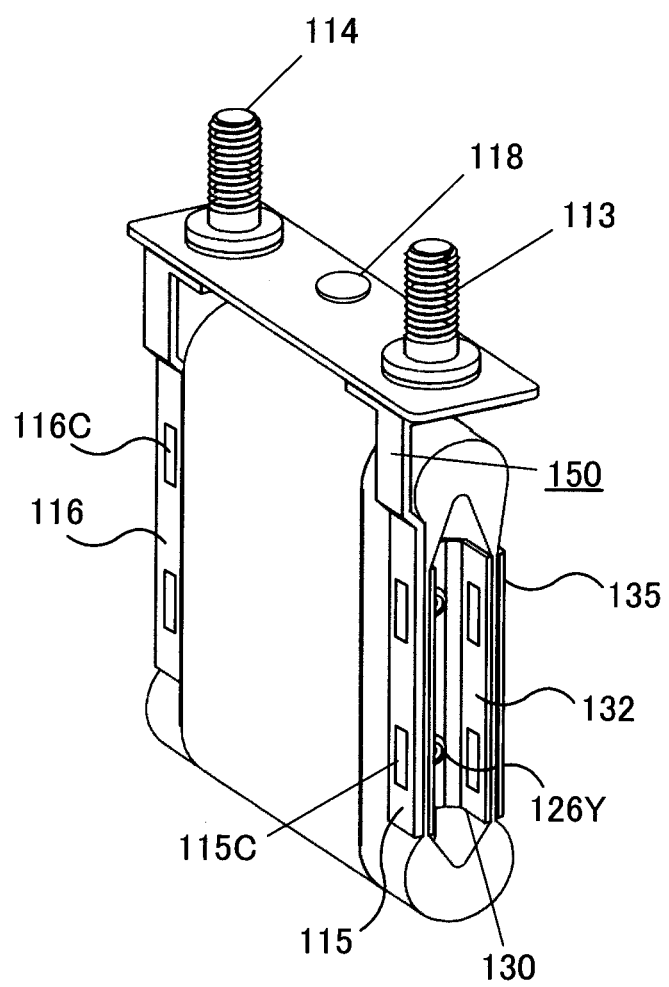
FIG. 13 is a perspective view showing an assembly of discharge and charge elements in the fourth embodiment of the secondary cell according to the present invention.

As shown in FIG. 13, in the fourth embodiment, one of the positive electrode connecting pieces 115B and one of the negative electrode connecting pieces 116B of the second embodiment are curtailed. As shown in FIG. 13, the positive foil 122 is sandwiched and ultrasonic welded between a wear plate 135, which is used in place of the positive electrode connecting piece, and the positive electrode connection portion 132 of the positive electrode supporting body 130. Similar configuration is adopted for the negative electrode connection portion 124A.

As a result, assembly workability is further improved herein than in the second embodiment, and the work to form in advance the positive foil deformed portion 122B and the negative foil deformed portion 124B can be curtailed.

Fifth Embodiment

The fifth embodiment of the secondary cell according to the present invention will be explained with reference to FIG. 14.

It is to be noted that parts in the figures that are identical or corresponding to those in the first embodiment are designated by the same reference numerals, and their description will be curtailed.

Figure 14:
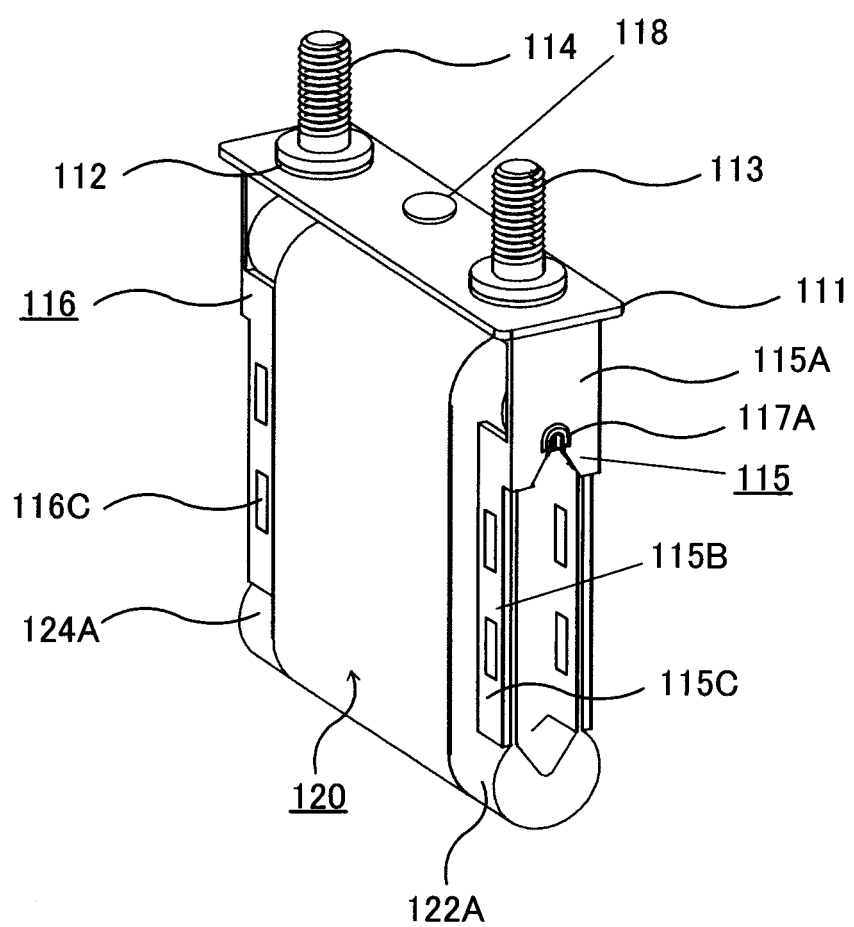
FIG. 14 is a perspective view showing an assembly of discharge and charge elements in the fifth embodiment of the secondary cell according to the present invention.

As shown in FIG. 14, the fifth embodiment is equivalent to the first embodiment but the positive and negative electrode supporting bodies 130 and 140 are curtailed. The positive and negative electrode connecting pieces 115B and 116B of the positive and negative electrode current collector plate 115 and 116 are directly welded to the positive foil 122 and the negative foil 124, respectively. In addition, the projections 1267K of the winding core 126 are each engaged and heat-welded to the bases 115A and 116A of the positive and negative electrode current collector plates 115 and 116. Thus, the positive and negative electrode current collector plates 115 and 116 and the winding core 126 are directly connected.

The following operations and advantageous effects can be achieved according to the secondary cell according to the fifth embodiment.

(1) Since the positive and negative electrode supporting bodies 130 and 140 are curtailed, the number of components becomes less than that in the first embodiment, thereby reducing weight and making assembly easy.

(2) Although the electrode winding assembly 120 is not supported by the positive and negative electrode supporting bodies 130 and 140, since the winding core 126 is directly connected to the positive and negative electrode current collector plates 115 and 116, thereby assuring vibration resistance and shock resistance.

Sixth Embodiment

The sixth embodiment of the secondary cell according to the present invention will be explained with reference to FIG. 15.

It is to be noted that parts in the figures that are identical or corresponding to those in the third embodiment are designated by the same reference numerals, and their description will be curtailed.

Figure 15:
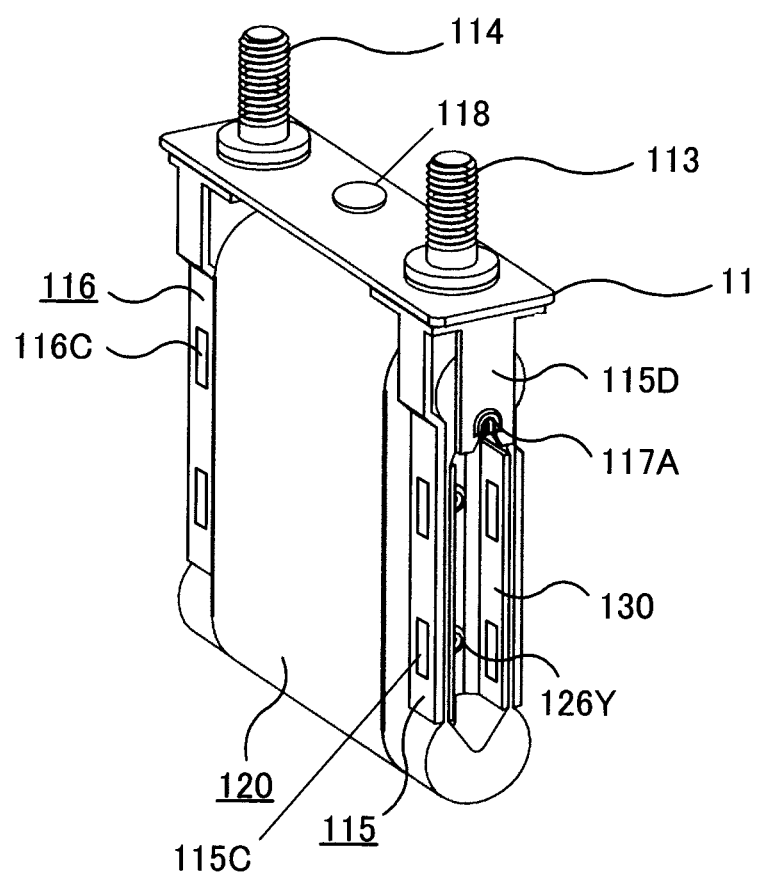
FIG. 15 is a perspective view showing an assembly of discharge and charge elements in the sixth embodiment of the secondary cell according to the present invention.

As shown in FIG. 15, in the sixth embodiment, one of the positive electrode connecting pieces 115B and one of the negative electrode connecting pieces 116B, shown in FIG. 12, of the third embodiment are curtailed.

As a result, assembly workability is further improved herein than in the third embodiment.

Variation of First to Sixth Embodiments

In the first to sixth embodiments, both the positive electrode current collector plate 115 and the negative electrode current collector plate 116 are provided and connected to the positive foil 122 and the negative foil 124, respectively. However, it is acceptable to curtail one of the positive electrode current collector plate 115 and the negative electrode current collector plate 116 and use another connection means so as to connect the positive foil 122 or the negative foil 124 to the positive electrode 123 or the negative electrode 125.

Vibration resistance and shock resistance which are higher than conventional ones can be achieved even through one of the current collector plates.

Variation of First to Fourth and Sixth Embodiments

In the first to fourth and sixth embodiments, the positive electrode supporting body 130 and the negative electrode supporting body 140 are provided on the inner peripheral side of the winding axial ends of the electrode winding assembly 120. However, it is acceptable to adopt only one of the positive electrode supporting body 130 on the positive electrode side and the negative electrode supporting body 140 on the negative electrode side and curtail the other.

Vibration resistance and shock resistance which are higher than conventional ones can be achieved even through one of the supporting bodies.

Variation of First Embodiment

In the first embodiment, ultrasonic welding is described as an example of methods to weld the positive and negative foils 122 and 124 (the positive and negative electrode connection portions 122A and 124A), the positive and negative electrode supporting bodies 130 and 140, and the positive and negative electrode current collector plates 115 and 116. However, they may be connected by resistant spot welding, laser welding, or friction stir welding. The same is true for welding methods for the positive and negative electrode current collector plates 115 and 116 of the other embodiments.

Variation of First to Sixth Embodiments

In the first to sixth embodiments, the ultrasonic welding zones 115C and 116C on the positive and negative electrode connection portions 132 and 142, respectively, are arranged symmetrically with respect to the winding axis. However, another ultrasonic welding zone may be provided outward of the ultrasonic welding zones 115C and 116C.

As a result, since the positive and negative electrode supporting bodies 130 and 140 can be fixed at three points, i.e., the winding core 126 and the plurality of ultrasonic connection portions 115C and 116C, support strength of the winding core 126 can be improved and deflection can be prevented, thereby improving vibration resistance and shock resistance.

Variation of First to Sixth Embodiments

In the first to sixth embodiments, the structure is described in which the positive and negative electrode current collector plates 115 and 116 are arranged on the winding outer peripheral surface side of the electrode winding assembly 120. However, the same advantageous effect can be achieved by arranging the positive and negative electrode current collector plates 115 and 116 on the winding inner peripheral side, ultrasonic welding the positive and negative foils with the positive and negative electrode current collector plates, and fixing the positive and negative electrode current collector plates and the winding core 126.

It is to be noted that sizes of the foils, the winding cores and the like are not limited to those of explained in the above embodiments.

Variation of Fourth embodiment

In the fourth embodiment, one of the positive electrode connecting pieces 115B and one of the negative electrode connecting pieces 116B of the second embodiment are curtailed. However, one of the positive electrode connecting pieces 115B and one of the negative electrode connecting pieces 116B of the positive electrode current collector plate 115 and the negative electrode current collector plate 116 in the first embodiment may also be curtailed.

In other words, the bases 115A and 116A may be added in the fourth embodiment.

According to the embodiments of the present invention explained above, reduction of a secondary cell in size and weight can be achieved while sufficient strength is assured.

The above described embodiments are examples, and various modifications can be made without departing from the scope of the invention.

What is claimed is:

1. A secondary cell, comprising:
   an electrode roll in which a positive foil on which a positive-electrode material is coated and a negative foil on which a negative-electrode material is coated are wound through a separator into a flat shape around a winding core;
   a case in which the electrode roll is housed;
   a cover which seals the case;
   a positive terminal and a negative terminal provided on the cover;
   a positive electrode current collector plate that is electrically connected to the positive foil of the electrode roll and the positive terminal and held by the cover; and
   a negative electrode current collector plate that is electrically connected to the negative foil of the electrode roll and the negative terminal and held by the cover, wherein:
   the positive electrode current collector plate and the negative electrode current collector plate are each connected to the winding core,
   the winding core includes a wide portion at a cover side of the winding core,
   the winding core includes first projections that project from both end faces of the wide portion of the winding core,
   the first projections project along a winding axis direction of the electrode roll, and
   one of the first projections is engaged with a current collector plate connection portion of the positive electrode current collector plate, and another of the first projections is engaged with a current collector plate connection portion of the negative electrode current collector plate so as to fix the first projections and each of the positive and negative electrode current collector plates.

2. A secondary cell according to claim 1, further comprising:
   a positive electrode supporting body that fits on an inner peripheral side of the electrode roll at a positive electrode-side end in the winding axis direction of the electrode roll and is connected with the winding core; and a negative electrode supporting body that fits on an inner peripheral side of the electrode roll at a negative electrode-side end in the winding axis direction of the electrode roll and is connected with the winding core, wherein:

the winding core further includes a plurality of second projections that project from both end faces of the winding core along the winding axis direction of the electrode roll, and the positive and negative electrode supporting bodies are connected to the plurality of second projections.

3. A secondary cell according to claim 2, wherein:
the plurality of second projections to which the positive electrode supporting body and the negative electrode supporting body are connected are arranged on each end face of the winding core at positions separated from each other on a cover side and a case bottom side across a winding axis.

4. A secondary cell according to claim 2, wherein:
the first projections are arranged between the second projections and the positive and negative terminals.

5. A secondary cell according to claim 1, wherein:
the positive electrode current collector plate includes a pair of positive electrode connecting pieces, wherein each of the positive electrode connecting pieces contacts a first deformed portion formed on both sides of the electrode roll, which are flat outer surfaces of the electrode roll;
the negative electrode current collector plate includes a pair of negative electrode connecting pieces, wherein each of the negative electrode connecting pieces contacts a second deformed portion formed on the both sides of the electrode roll, which are the flat outer surfaces of the electrode roll; and
the pair of positive electrode connecting pieces and the pair of negative electrode connecting pieces are welded to the positive foil and the negative foil, respectively, of the first and second deformed portions.

6. A secondary cell according to claim 1, wherein:
the positive electrode current collector plate and the negative electrode current collector plate each include one connecting piece that contacts a deformed portion formed on one of both sides of the electrode roll, which are flat outer surfaces of the electrode roll; and
the positive electrode connecting piece and the negative electrode connecting piece are welded to one side of the positive foil and the negative foil, respectively, of the deformed portion.

7. A secondary cell according to claim 1, wherein:
the positive electrode current collector plate and the negative electrode current collector plate each include a pair of connecting pieces which are deformable towards and away from both sides of the electrode roll, which are flat outer surfaces of the electrode roll, the pair of connecting pieces of the positive electrode current collector plate are connected to the positive foil, and the pair of connecting pieces of the negative electrode current collector plate are connected to the negative foil.

8. A secondary cell according to claim 1, wherein:
the positive electrode current collector plate and the negative electrode current collector plate each include one connecting piece which is deformable towards and away from one of both sides of the electrode roll, which are flat outer surfaces of the electrode roll, the positive electrode current collector plate is connected to the positive foil through the connecting piece and the negative electrode current collector plate is connected to the negative foil through the connecting piece.

9. A secondary cell according to claim 1, wherein:
a first deformed portion formed on the electrode roll is sandwiched and welded between a pair of connection portions of a positive electrode supporting body and a pair of connecting pieces of the positive electrode current collector plate, and a second deformed portion formed on the electrode roll is sandwiched and welded between a pair of connection portions of a negative electrode supporting body and a pair of connecting pieces of the negative electrode current collector plate.

10. A secondary cell, comprising:
an electrode roll in which a positive foil on which a positive-electrode material is coated and a negative foil on which a negative-electrode material is coated are wound through a separator into a flat shape around a winding core;
a case in which the electrode roll is housed;
a cover which seals the case;
a positive terminal and a negative terminal provided on the cover;
a positive electrode current collector plate that is electrically connected to the positive foil of the electrode roll and the positive terminal and held by the cover;
a negative electrode current collector plate that is electrically connected to the negative foil of the electrode roll and the negative terminal and held by the cover;
a positive electrode supporting body that fits on an inner peripheral side of the electrode roll at a positive electrode-side end in a winding axis direction of the electrode roll and is connected with the winding core; and
a negative electrode supporting body that fits on an inner peripheral side of the electrode roll at a negative electrode-side end in the winding axis direction of the electrode roll and is connected with the winding core, wherein:
the winding core includes a wide portion at a cover side of the winding core,
the winding core includes first projections that project from both end faces of the wide portion of the winding core, and a plurality of second projections that project from both end faces of the winding core,
the first projections and the plurality of second projections project along the winding axis direction of the electrode roll,
the positive and negative electrode supporting bodies are connected to the plurality of second projections, and
the first projections are engaged and fixed to current collector plate connection portions.

11. A secondary cell according to claim 10, wherein:
the plurality of second projections to which the positive electrode supporting body and the negative electrode supporting body are connected are arranged on each end face of the winding core at positions separated from each other on a cover side and a case bottom side across a winding axis.

* * * * *